UNITED STATES PATENT OFFICE.

ANGIOLO P. AGRESTA, OF NEW YORK, AND ANTONIO MEUCCI, OF CLIFTON, N. Y.

IMPROVEMENT IN SAUCES FOR FOOD.

Specification forming part of Letters Patent No. 142,071, dated August 26, 1873; application filed July 9, 1873.

*To all whom it may concern:*

Be it known that we, ANGIOLO P. AGRESTA, of New York city, in the State of New York, and ANTONIO MEUCCI, of Clifton, Richmond county, and State of New York, have invented certain Improvements relating to Sauces, of which the following is a specification:

The sauce is intended more particularly for use in preparing maccaroni according to the Italian style, but it can be useful with various other kinds of food. It may be applied with advantage in vegetable food, or food having a nearly neutral flavor.

The proportions of the different ingredients are about as follows: We take one hundred pounds of meat of good quality, with a large preponderance of lean; one-fourth pound of fat salt pork; eight pounds of fresh tomato, or one pound tomato extract; eight pounds of finely-cut carrot; eight pounds of finely-divided celery; four pounds of onions; one-half pound of the best Cooper's or other first-quality gelatine; one-half pound of salt; one ounce of pepper; brown over a slow fire, taking care not to allow it to burn. When brown we add a sufficient quantity of warm water and boil till it is thoroughly cooked; and in case too much water has been added, when it has been reduced by evaporation to the consistency of a gravy we add the juice of three lemons; put it up in air-tight cans in a manner analogous to that in which various meats and vegetables are preserved. To be more specific on this point, we have, in our most successful experiments, first allowed it to cool after the long slow boiling, then have put it up in cans and placed the cans in a vessel filled with cold water, and heated the water till it reached boiling, then removed the fire and allowed the cans to remain until the water cooled. We believe that our sauce thus canned will keep in any climate for a long time.

The best meats for this gravy are beef and mutton. The two mixed serve very well. We have used iron vessels for the boiling, but wood can be used with provisions for applying heat by a coil filled with steam.

The use of the gravy may be varied infinitely. The cans may be made of various sizes and materials. We propose to accompany each can with full instructions, and with a special trade-mark.

We claim as our invention—

The sauce prepared and preserved in the manner and of the materials herein set forth.

In testimony whereof we have hereunto set our hands this 8th day of July, 1873, in the presence of two subscribing witnesses.

A. P. AGRESTA.
        ANTONIO MEUCCI.

Witnesses:
  ARNOLD HÖRMANN,
  WM. C. DEY.